(12) United States Patent
Cardarelli

(10) Patent No.: US 7,617,728 B2
(45) Date of Patent: Nov. 17, 2009

(54) TUNING FORK GYROSCOPE

(76) Inventor: Donato Cardarelli, 16 Ledgetree Rd., Medfield, MA (US) 02502

(*) Notice: Subject to any disclaimer, the term of this patent is extended or adjusted under 35 U.S.C. 154(b) by 76 days.

(21) Appl. No.: 11/383,814

(22) Filed: May 17, 2006

(65) Prior Publication Data
US 2007/0266785 A1 Nov. 22, 2007

(51) Int. Cl.
G01P 9/04 (2006.01)
(52) U.S. Cl. ..................... 73/504.16; 73/510
(58) Field of Classification Search ............ 73/318, 73/504.03, 504.04, 514.16, 514.35, 652, 73/504.12, 504.16
See application file for complete search history.

(56) References Cited
U.S. PATENT DOCUMENTS 4,179,818 A * 12/1979 Craig ................. 33/321
5,359,893 A * 11/1994 Dunn ................ 73/504.12
5,992,233 A * 11/1999 Clark ................ 73/514.35
6,250,158 B1 * 6/2001 Stewart ............. 73/504.14
6,513,380 B2 * 2/2003 Reeds et al. ....... 73/504.12

FOREIGN PATENT DOCUMENTS
JP 11-64002 * 3/1999

* cited by examiner

Primary Examiner—John E Chapman
(74) Attorney, Agent, or Firm—Brian M. Dingman; Mirick O'Connell, DeMallie & Louge, LLP

(57) ABSTRACT

A gyroscope for detecting rotation about a gyro input axis, having a support structure, at least one mass flexibly coupled to the support structure such that it is capable of motion in two directions along a drive axis, the mass offset from the gyro output axis, one or more drives for oscillating the flexibly-coupled masses along the drive axis, one or more mass motion sensors that sense motion of the flexibly-coupled masses along their drive axes, and one or more gyro output sensors that detect rotation of the support structure about the output axis.

8 Claims, 12 Drawing Sheets

Z-Gyroscope concept.

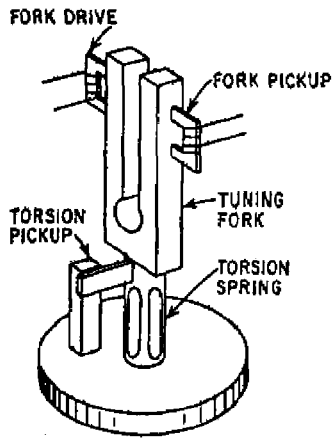
Figure 1    Tuning fork gyro concept.
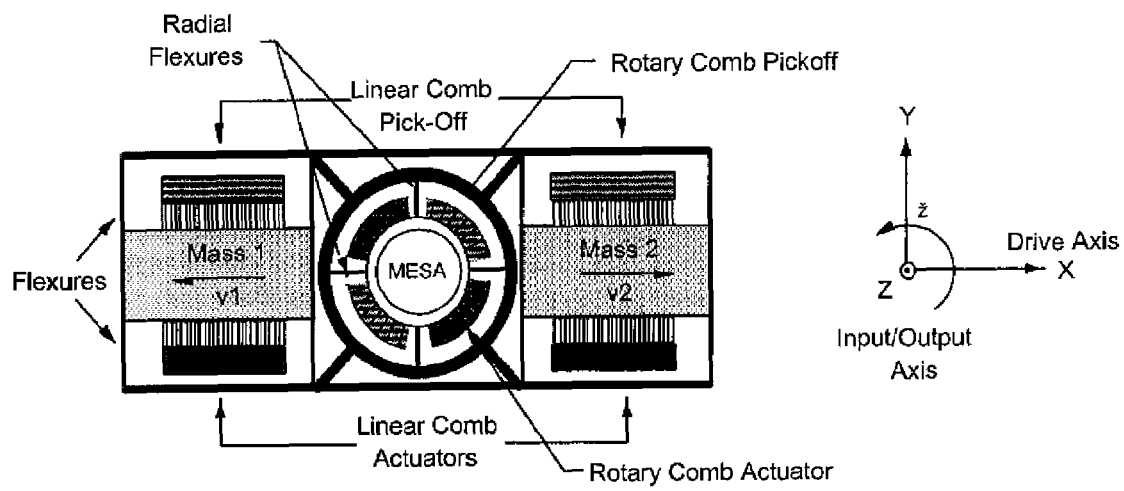
Figure 2    Z-Gyroscope concept.

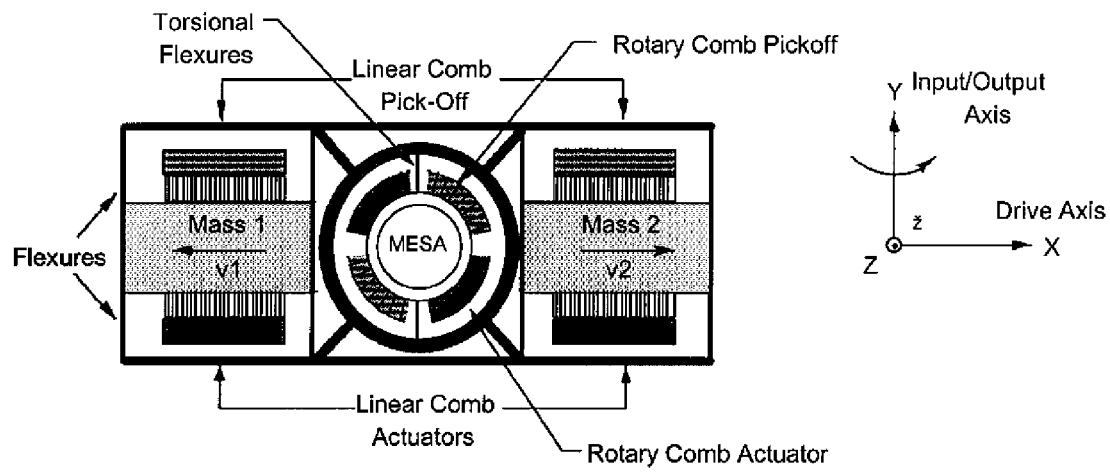
Figure 3    X-Gyroscope concept.
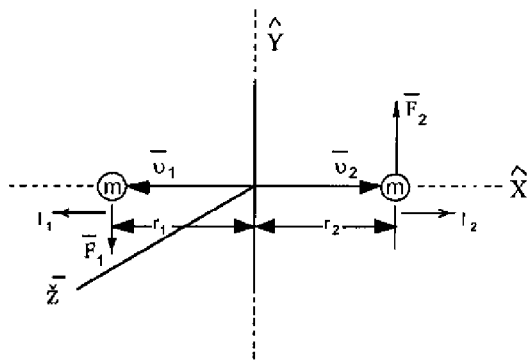
Figure 4    Vector diagram of Coriolis forces for outward mass motion.

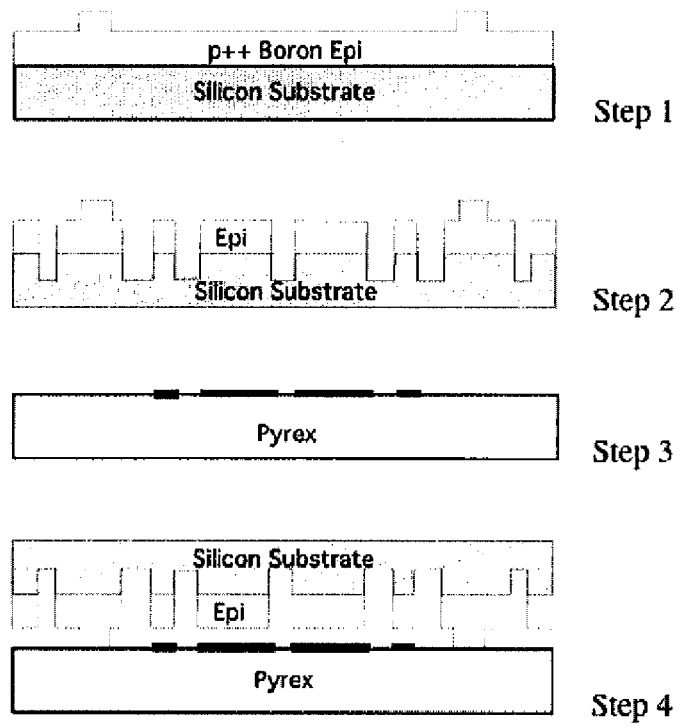
Figure 5     Four mask Dissolved Wafer Process steps.
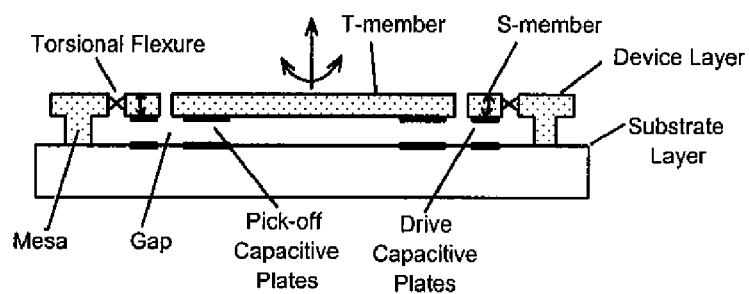
Figure 6     Side-view of completed device after silicon substrate is etched away.

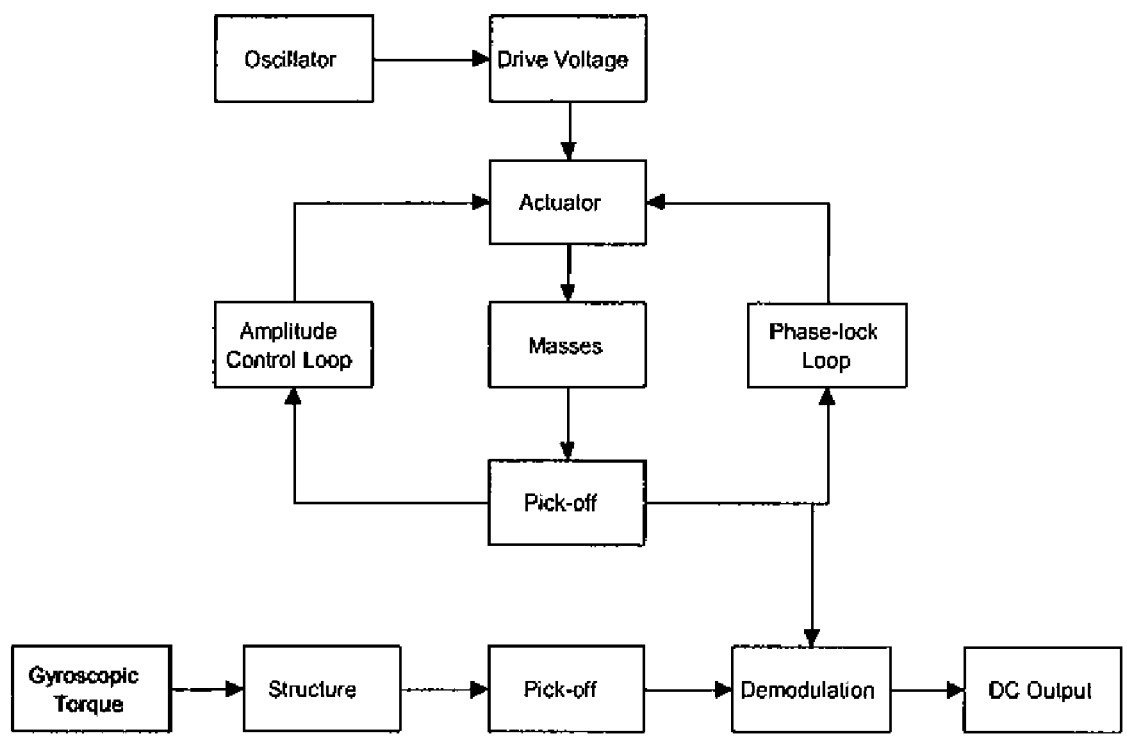
Figure 7    Electronics of the gyroscope.

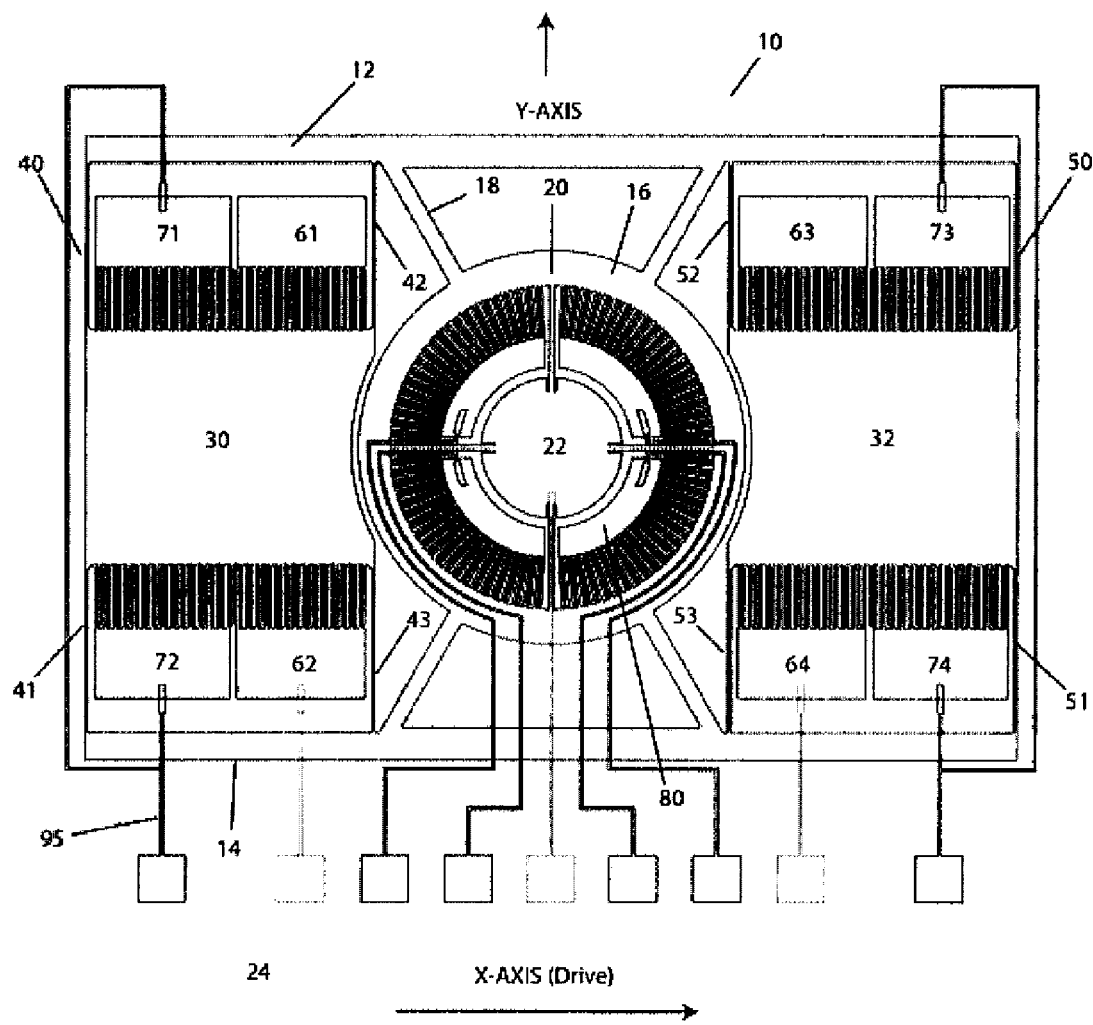
Figure 8     Z-Gyroscope Design

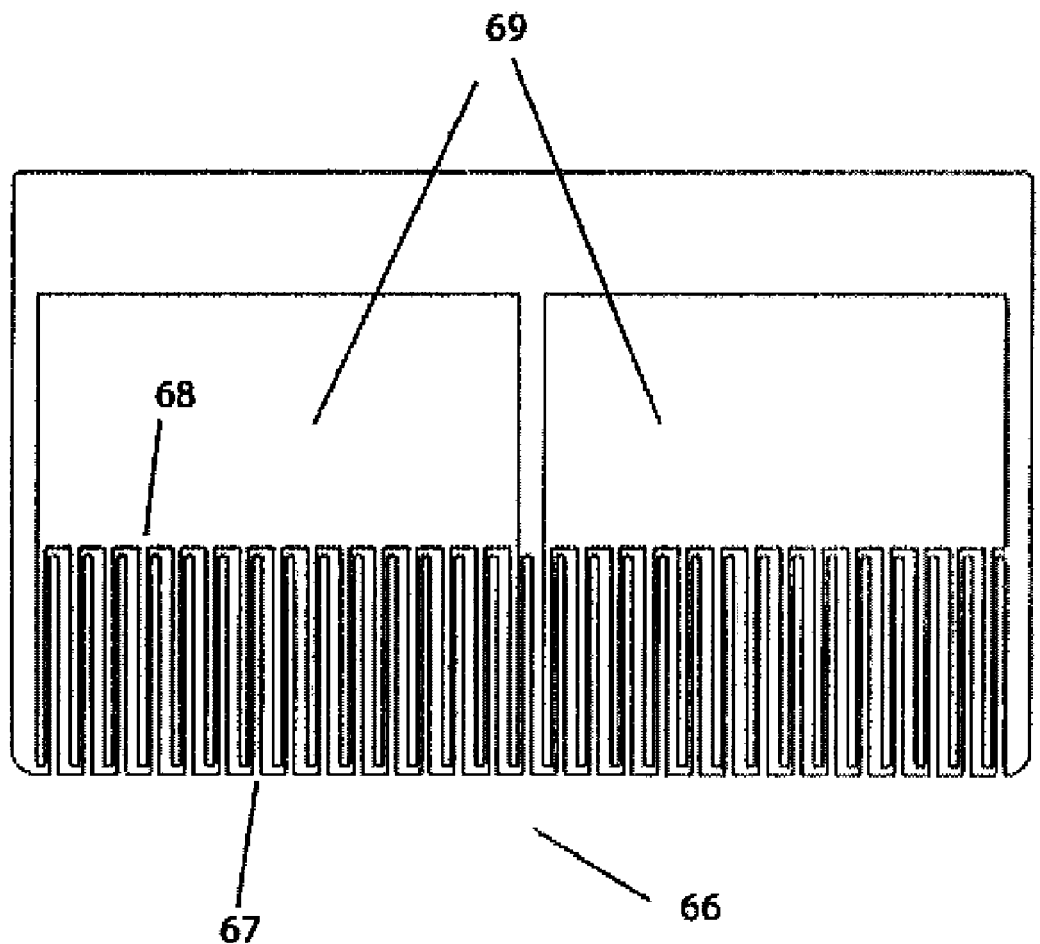
Figure 9    Linear Comb Design

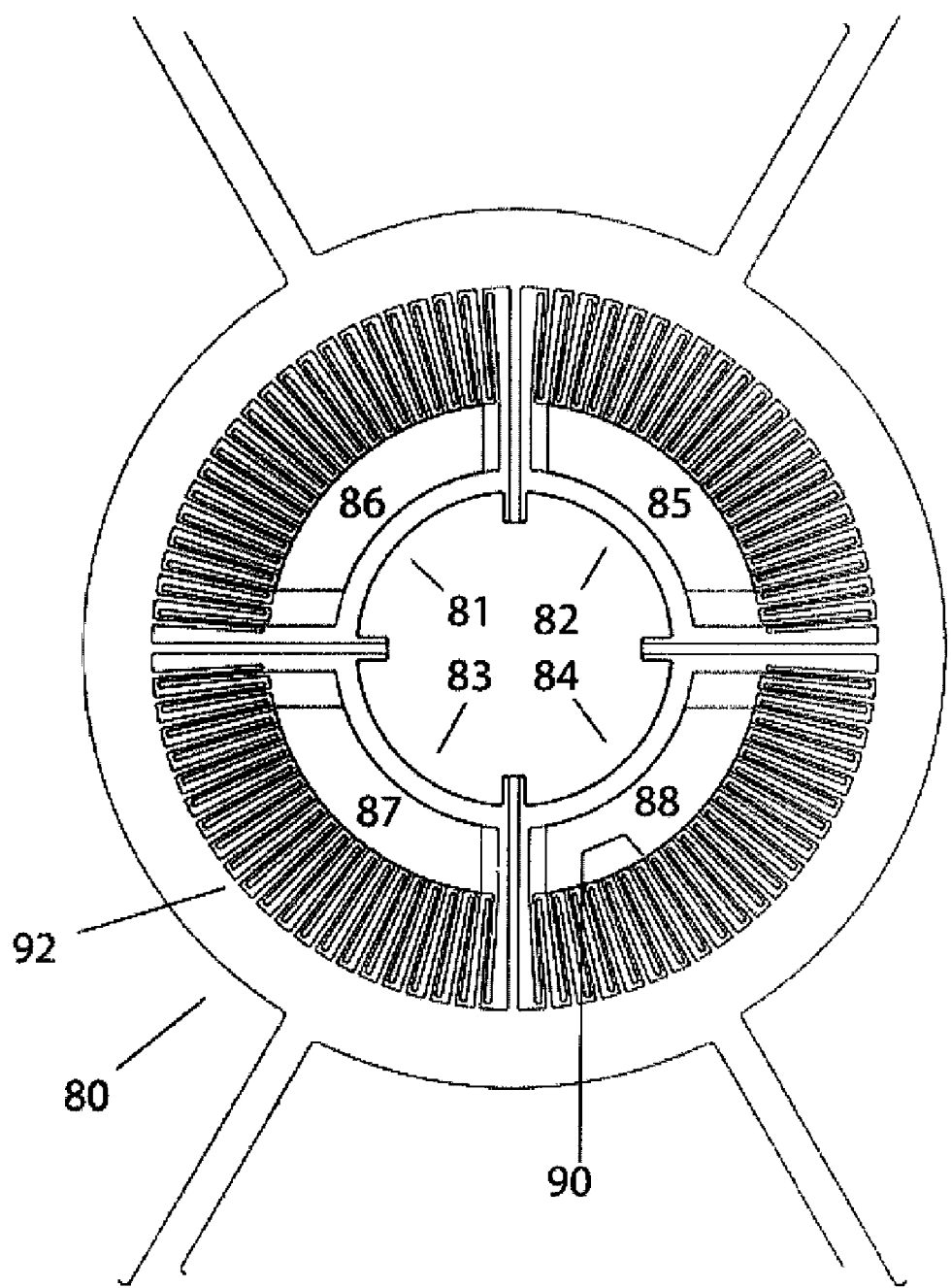
Figure 10    Rotary Comb Design

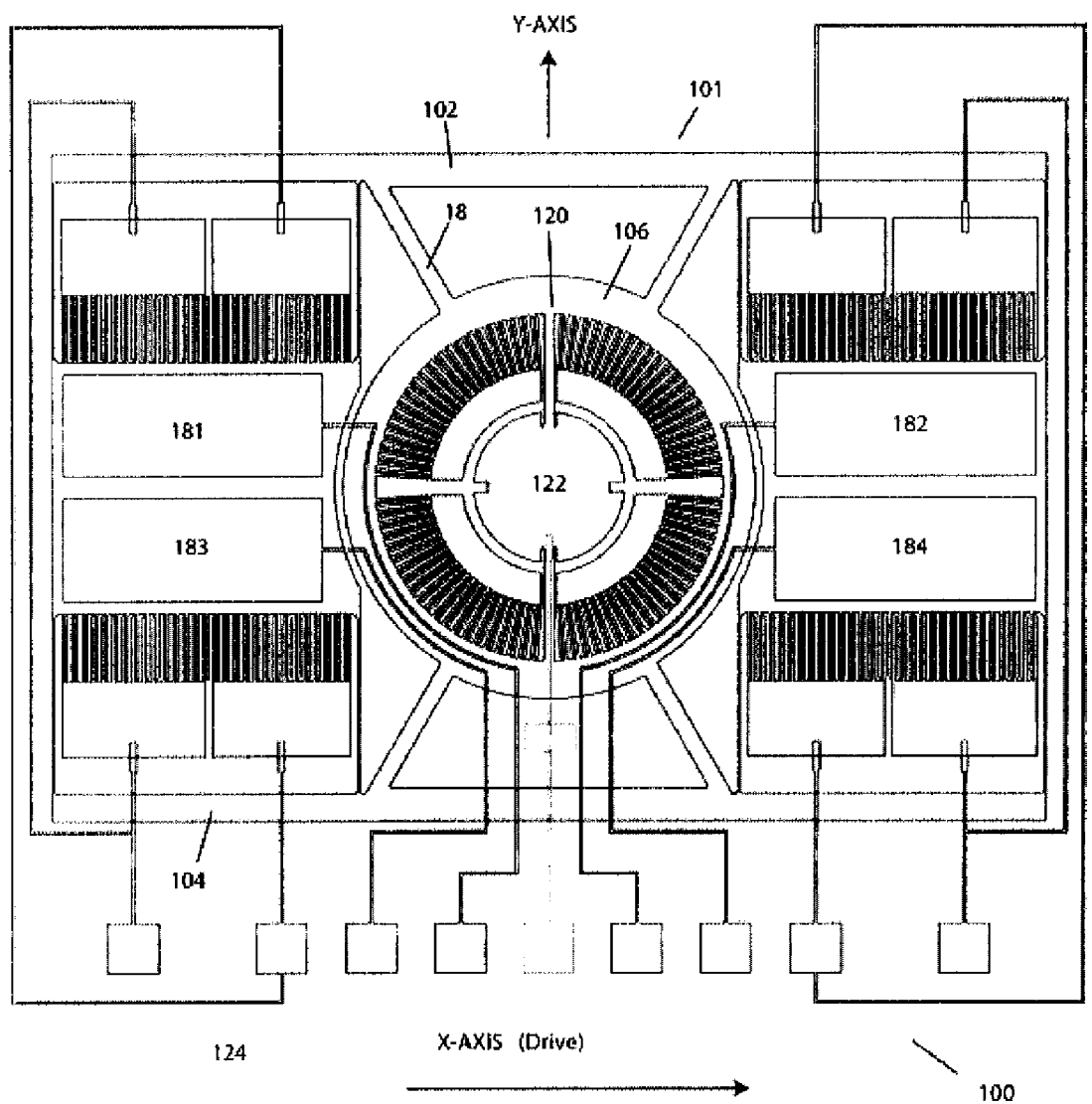
Figure 11    X-Gyroscope Design

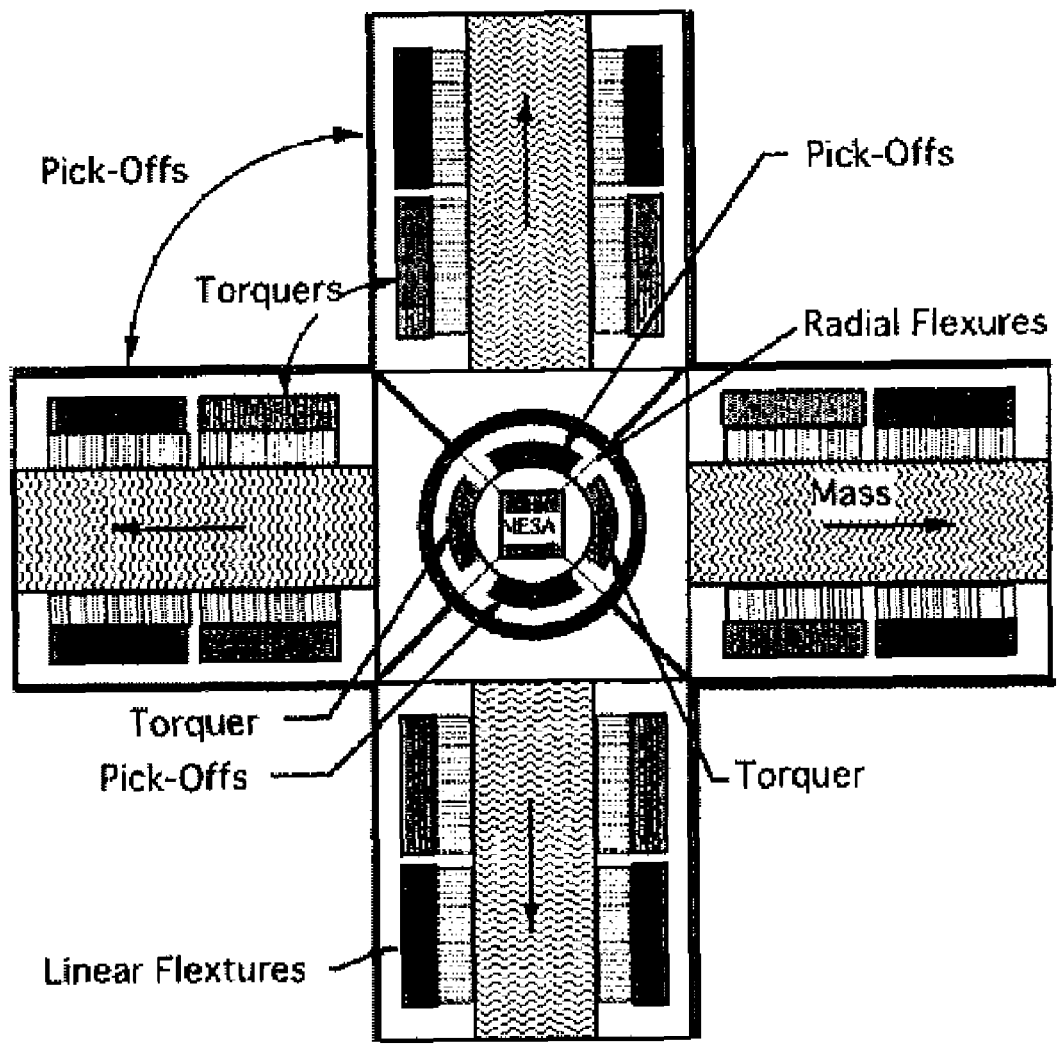
Figure 12   Four-mass Z-Gyro design.

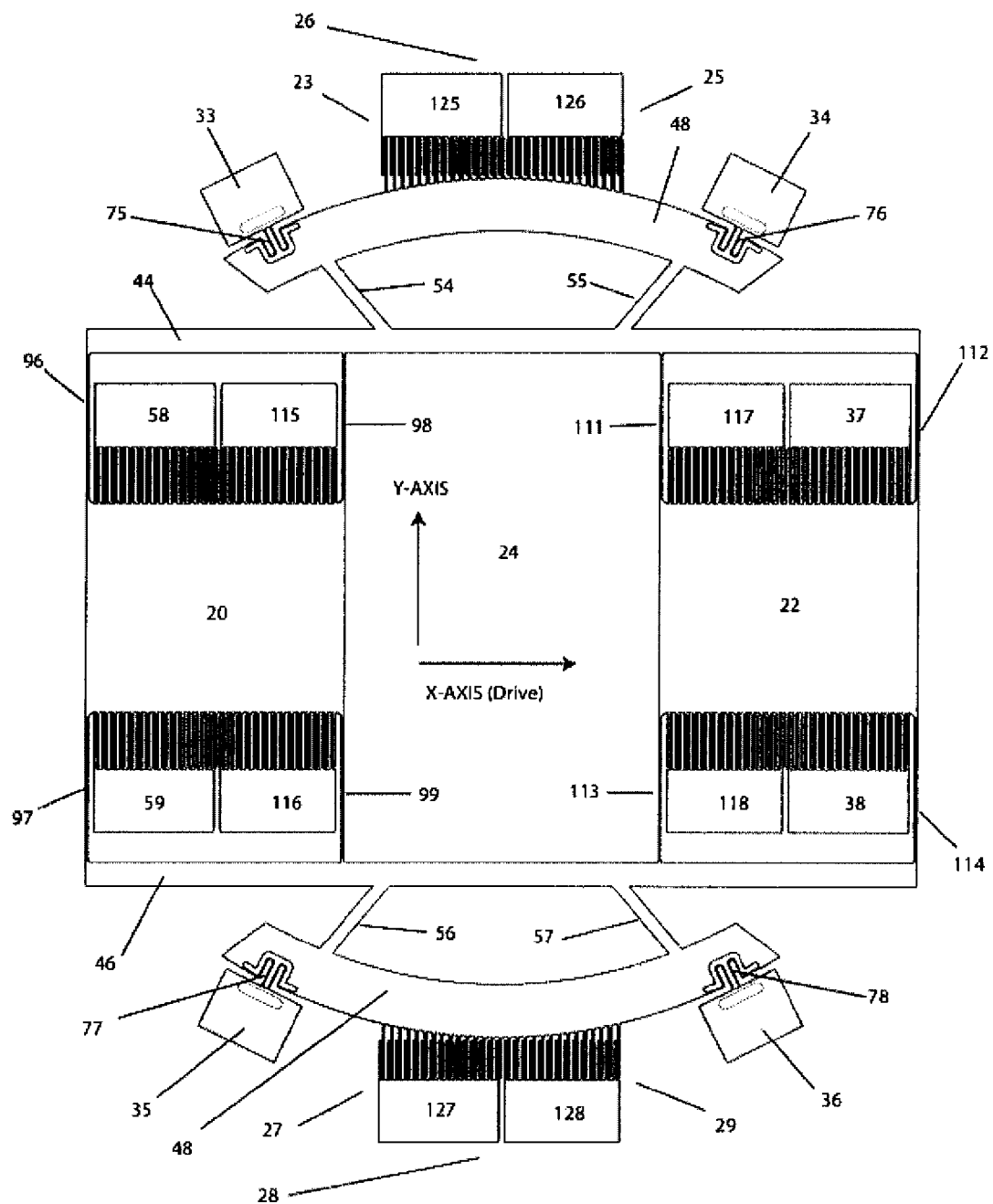
Figure 13    Z-Gyro design with outer output pick-off.

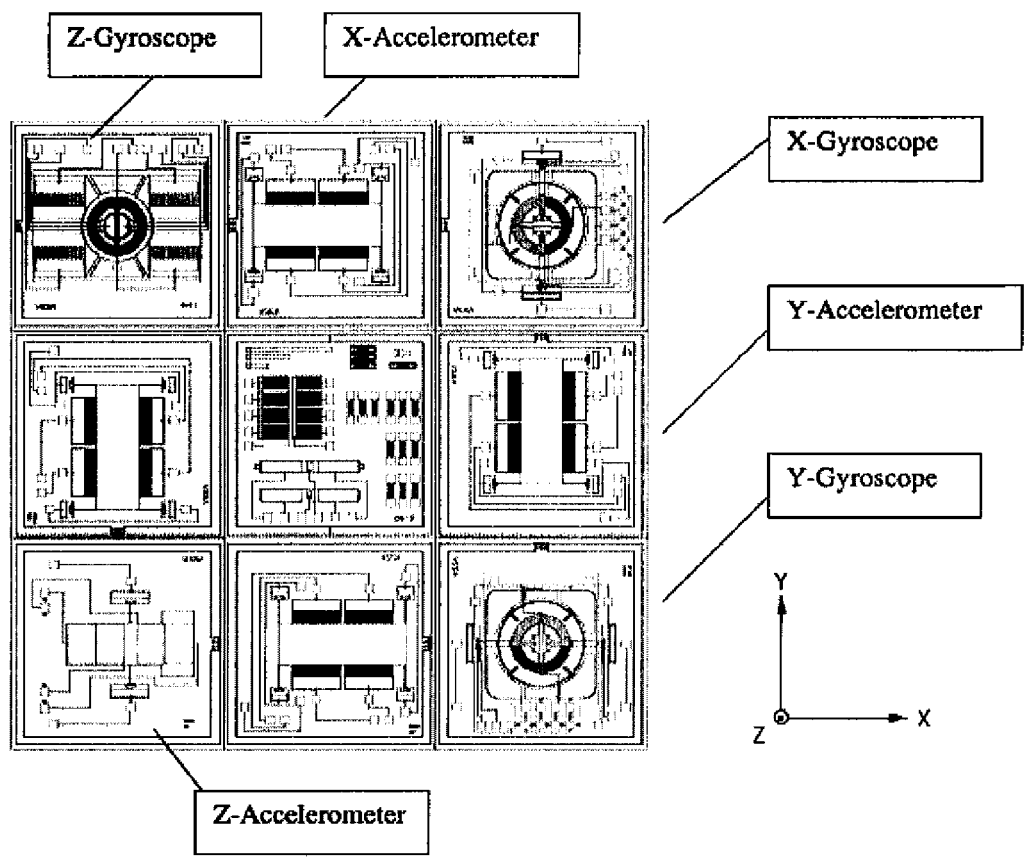
Figure 14    Mask design of the Integrated IMU with the added Z-gyroscope.

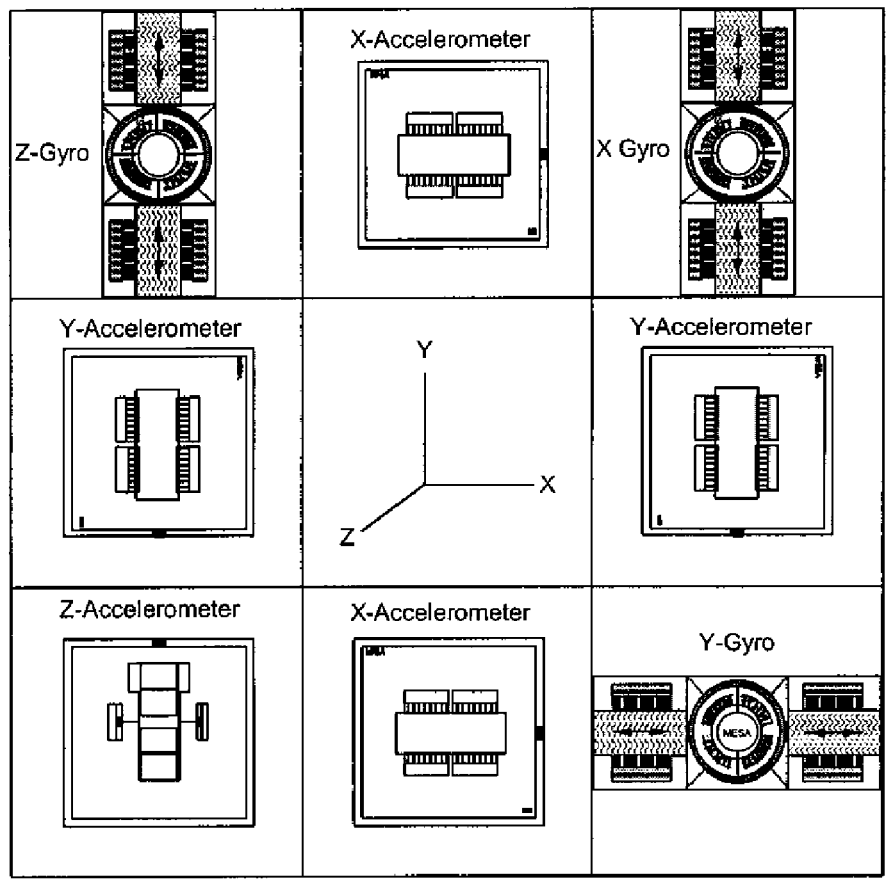
Figure 15    Integrated IMU Concept with Tuning Fork X and Z-Gyroscopes.
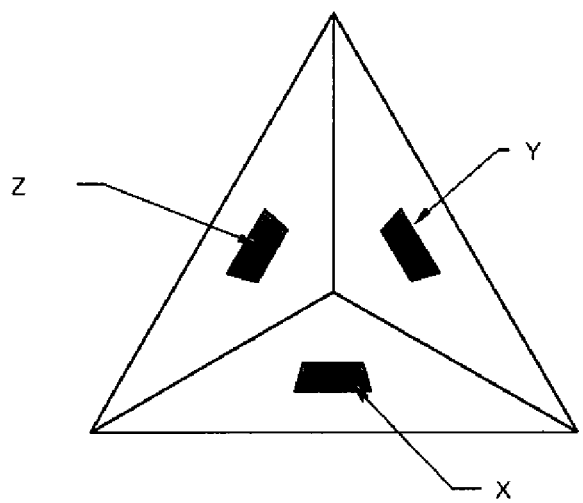
Figure 16    Pyramidal IMU concept.

TUNING FORK GYROSCOPE

STATEMENT REGARDING FEDERALLY SPONSORED RESEARCH

This invention was made with government support under contract number F08630-03-C-0149 issued by AFRL/MNGN, Eglin AFB. The government has certain rights in this invention.

FIELD OF THE INVENTION

This invention relates to gyroscope designs.

BACKGROUND OF THE INVENTION

The Z-gyroscope is one of two planar gyroscope designs that can be derived from tuning fork gyroscopes. Examples of tuning fork gyroscopes include the Sperry Rate Gyrotron (Morrow, C. T.: J. Acoust. Soc. Amer., 27:56; 27:62; 27:581 (1955)) shown in FIG. 1, and the gyroscopes in U.S. Pat. No. 6,481,283. In its operation, the tines of the tuning fork are driven to vibrate laterally. Under rotation about the Input Axis (parallel to the tines), the tuning fork responds by oscillating about the Input Axis, subject to the restraint of the torsion spring. The output motion amplitude as measured by a torsion pick-up is proportional to the input rate.

SUMMARY OF THE INVENTION

The integration of Micro-Electro-Mechanical Systems (MEMS) gyroscopes and accelerometers to form Inertial Measurement Units (IMUs) on a single chip requires that the instruments are planar. A Z-gyroscope is necessary to make a fully planar IMU and sense rotation rate about the axis normal to the plane of the IMU.

The inventive Z-gyroscope is based on the tuning fork Coriolis gyro concept. A companion X-gyroscope can also be formed with a minor modification of the Z-gyroscope. This invention relates to designs of the Z-gyroscope and its companion X-gyroscope.

The Z-gyroscope also enables an IMU based on a pyramidal design containing three Z-gyroscopes mounted to the three, orthogonal faces of a three-sided pyramid. The advantage of the Z-Pyramid IMU is that the gyroscopes do not require alignment since the sensitive axis of the Z-gyro is parallel with the normal of each pyramid face.

This invention further relates to a MEMS Z-gyroscope design based on a double-ended tuning fork concept. It is a planar design. When combined with X, Y gyroscopes and accelerometers it enables a fully planar IMU on a single chip. Of course the Z-Gyro can also be used by itself.

This invention further relates to the components of the design and how they provide the functionality of the gyroscope. It also relates to the design of the gyro components to optimize the wanted functionality (capability and sensitivity) and minimize the unwanted effects.

This invention further relates to the design of a related X, Y gyroscope based on the same tuning fork concept.

This invention further relates to the two parallel beams structure that supports the oscillating masses and provides feedback between the two that phase-locks their motion resulting in a common oscillation frequency for both masses.

This invention further relates to an alternate Z-gyro design based on four masses. More than two masses can be used in general and four masses are used in this particular case.

This invention further relates to the simpler case where only one mass is used; its center of mass is displaced from the center of rotation. This eliminates the requirement to phase-lock the two masses to each other.

This invention further relates to a general Z-gyro concept based on a ring, the diameter of which oscillates in the plane.

This invention further relates to a structural design that can be separated into electrical regions that allows the masses to be driven relative to the structure and not relative to the substrate.

This invention further relates to an alternate Z-gyro design where the output pick-off is located outside of the two-beam structure in order to increase the signal and to provide a more robust bonding of the gyro to the substrate.

BRIEF DESCRIPTION OF THE DRAWINGS

Other objects, features and advantages will occur to those skilled in the art from the following descriptions of the preferred embodiments, and the accompanying drawings, in which:

FIG. 1 is an illustration of the basic prior art tuning fork gyroscope concept.

FIG. 2 shows the Z-gyroscope double-ended tuning fork concept.

FIG. 3 shows the X-gyroscope double-ended tuning fork concept.

FIG. 4 is a vector diagram for describing the principle of operation for the Z-gyroscope of FIG. 2.

FIG. 5 describes the preferred gyroscope fabrication process used.

FIG. 6 is a side view of a completed fabricated sample instrument by the process shown in FIG. 5.

FIG. 7 is a block diagram of the electronics of the gyroscope of the invention.

FIG. 8 depicts an embodiment of a Z-gyroscope design of the invention comprising its components.

FIG. 9 depicts an embodiment of the linear comb design for the gyroscope of FIG. 8 including the actuator and pick-off for driving one mass and sensing its motion.

FIG. 10 depicts an embodiment of the rotary actuator/pick-off for the gyroscope of FIG. 8 including the stators and the rotors; the stators are attached to the substrate and the rotors are part of the oscillating structure.

FIG. 11 depicts an embodiment of the X-gyroscope design of the invention comprising its components.

FIG. 12 is a conceptual embodiment of an alternative four mass Z-gyroscope design of the invention.

FIG. 13 depicts an embodiment of the Z-gyroscope design of the invention with a rotary pick-off with a larger radius.

FIG. 14 depicts a conceptual embodiment of an integrated IMU (gyroscopes and accelerometers integrated onto the same chip at the wafer level) containing the Z-gyroscope of the invention.

FIG. 15 depicts a conceptual embodiment of an integrated IMU (gyroscopes and accelerometers integrated onto the same chip at the wafer level) containing double-ended tuning fork X, Y and Z-gyroscopes of the invention.

FIG. 16 depicts a conceptual embodiment of a pyramidal IMU of the invention.

DESCRIPTION OF THE PREFERRED EMBODIMENTS OF THE INVENTION

The Z-gyroscope concept results from a top view of the three dimensional object of FIG. 1 projected onto a plane. The X-gyroscope is obtained from a projection of the side view.

Double-ended Z-gyroscope and X-gyroscope designs are shown in cartoon form in FIGS. 2 and 3, respectively.

The preferred embodiments of both gyros are based on a rigid frame comprising two parallel beams, a ring and four bars that attach the beams to the ring. The frame is suspended from the substrate by a central post with radial flexures for the Z-gyro and two co-linear flexures for the X-gyro. Two masses are attached to the parallel beams, one at each end, each supported by four flexures, so that the masses can be oscillated in the direction parallel to the beams along the Drive Axis. The mode of motion for the masses is anti-phase; both move apart during the first half of the cycle and then towards each other during the second half. The masses and supporting flexures, as a system, are functionally equivalent to the tines of the Gyrotron.

For the Z-gyroscope, the radial flexures allow the output oscillation of the frame about the axis normal to the substrate (about the z-axis). For the X-gyro the output oscillation is towards and away from the surface of the substrate (about the y-axis, in this case).

A necessary requirement of both gyros with two or more oscillating masses is that the masses oscillate at the same frequency in anti-phase. In the Gyrotron, this condition is met by mechanically coupling the tines through the common post that holds them. For the inventive Z-gyroscope and X-gyroscope designs, the mechanical coupling is accomplished with the rigid frame.

One difference between the two designs (Z and X-gyroscope) is the flexure system that attaches the rigid frame to the mesa (the structure through which the frame is attached to the substrate). The second difference is the Input/Output axis. For the Z-gyroscope the Input/Output axis is the z-axis. For the X-gyroscope, the Input/Output axis is the y-axis. When the X-gyroscope is rotated by 90 degrees in the plane, the Input/Output axis is aligned with the x-axis and the gyro becomes a Y-gyro. The X-gyroscope and Y-gyroscope are identical, except for their orientation in the plane. It is a unique feature of tuning fork gyros that the Input and Output axes are parallel.

Linear and rotary comb actuators and pick-offs are also shown in FIGS. 2 and 3. Linear comb actuators are used to drive the masses into oscillation along a common axis and are designed so that the masses are driven in opposite directions by a common drive voltage. The actuator uses two sets of combs at opposite sides of each mass so that the combs do not produce torque to cause rotation of the structure about the output axis. Each actuator produces two orthogonal force components, along the drive axis and in a direction parallel to the comb finger long dimension. By breaking the actuator into the two parts, the hope is to cancel the latter force component. An improper match of the two halves can result in a rotary oscillatory motion of the structure that looks like gyro output motion. This error is called "quadrature". Fortunately its phase is at 90 degrees to the gyro signal and so it can be filtered by phase demodulation.

Linear comb pick-offs are used to sense the drive motion of the masses and the signal is input to a control loop to hold their amplitudes constant; a requirement for maintaining a constant gyroscopic sensitivity (Scale Factor). The output oscillations of the Z-gyro are sensed by the rotary comb pick-off, which measures the rotary oscillation of the frame. Although rotary actuation is not needed for the normal gyro operation, it is included in the design so that the frame can be driven in order to measure its frequency response. For the X-gyroscope, stationary pickoff capacitor plates are placed under the masses to sense their motion toward and away from the surface and for actuation of the output motion to measure its frequency response.

Principle of Z-Gyroscope Operation

The principle of operation for the Z-gyroscope is described with the vector diagram in FIG. 4. The center of each mass is located at distance $r_1$ for mass 1 and $r_2$ for mass 2. These are distances from the y-axis. The masses are driven in opposite directions along a common Drive Axis (x-axis). The masses are driven sinusoidally by the linear comb actuators at frequency $\omega$ with displacements $\tilde{1}_1 = \tilde{1}_1 \sin \omega t$ and $\tilde{1}_2 = \tilde{1}_2 \sin \omega t$, where $\tilde{1}_1$ and $\tilde{1}_2$ are the amplitudes of the motions of mass 1 and mass 2, respectively. The mass velocities are given by $\bar{v}_1 = \tilde{v}_1 \cos \omega t = \omega \tilde{1}_1 \cos \omega t$ and $\bar{v}_2 = -\tilde{v}_2 \cos \omega t = -\omega \tilde{1}_2 \cos \omega t$. For a symmetric design, $r_1 = r_2 = r$ and $\tilde{1}_1 = \tilde{1}_2 = \tilde{1}$. When the case undergoes an input rotation rate $\Omega$ about the z-axis (Input Axis), the masses experience Coriolis forces $\bar{F}_1 = m\bar{v}_1 \times \bar{\Omega}$ and $\bar{F}_2 = m\bar{v}_2 \times \bar{\Omega}$, respectively. Note that the forces act in the plane. $\bar{F}_1$ acts on mass 1 in the negative y-direction and $\bar{F}_2$ acts on mass 2 in the positive y-direction. Both forces act on the masses at radius, r, and their sum generates a torque to rotate the frame counter-clockwise about the axis normal to the plane; the axis is centered on the mesa (case). The output motion is allowed by radial flexures that connect the structure to the mesa. The gyro torque is given by $\Gamma_{gyro}$ (outward-oscillation)=$\bar{F}_1 \times \bar{r}_1 + \bar{F}_2 \times \bar{r}_2 = -2Fr\hat{z}$ which is further reduced to $\Gamma_{gyro}$ (out-osc)=$-2mrv\Omega \hat{z}$ or, equivalently, $\Gamma_{gyro}$ (out-osc)=$-2mr\omega \tilde{1}\Omega \hat{z} \cos \omega t$.

As the velocities of the masses reverse, the sign of the Coriolis torque also reverses. Therefore, as the masses oscillate outwards and then inwards sinusoidally, the frame oscillates counterclockwise and clockwise, respectively. The amplitude of these resulting oscillations is proportional to the input rotation rate experienced by the case, which is mounted to the vehicle.

For the X-gyroscope, the motion of the masses is set-up in the same way as it is for the Z-gyroscope, however the Input Axis is in the plane (along the torsional flexures) and the Coriolis forces act on the masses to cause motion out of the plane, in opposite directions for the two masses, causing a "see-saw" motion of the structure. The output motion is allowed by two torsional flexures that connect the frame to the mesa (case).

The sufficient equation of motion for the output motion of the Z-gyroscope frame is given by $$I_o \ddot{\vartheta} + D \dot{\vartheta} + K \vartheta = 2mr\omega \tilde{1}\Omega_z \cos \omega t \qquad (1)$$

The Coriolis torque derived above is the driving term of the mechanical oscillator comprising the frame and supporting radial flexures. $I_o$ is the moment of inertia of the frame plus attached masses about the Output Axis, D is the damping coefficient and K is the radial flexure stiffness. The output oscillatory motion is given by $\vartheta = \tilde{\vartheta} \sin(\omega t + \epsilon)$ where $\tilde{\vartheta}$ is the output amplitude, which is related to the input rotation rate by, $$\tilde{\vartheta} = \frac{2mr\omega \tilde{1}}{[D^2 \omega^2 + I^2(\omega^2 - \omega_T^2)^2]^{1/2}} \Omega_Z \qquad (2)$$

and $\omega_T$ is the resonance frequency of the frame and masses about the normal to the plane. The scale factor is given by the coefficient of the rotation rate, $\Omega_Z$. In order to maintain the scale factor constant, the amplitude and frequency of the mass oscillation must be held constant. Typically, the frequency is chosen to be the resonance frequency of the mass/flexure system to minimize the required drive voltage and power. In addition, if the drive frequency of the mass and flexure system and the resonance frequency of the frame, mass and rotational flexure system undergoing output oscillation are matched, the maximum output response, $\tilde{\vartheta}_{Max}$, is obtained $$\tilde{\vartheta}_{Max} = \frac{2mr\tilde{1}}{D}\Omega_Z \quad (3)$$

where the Scale Factor is given by $$SF = \frac{2mr\tilde{1}}{D}.$$

Because the output amplitude is dependent on the damping, maximization of the output signal requires a high vacuum environment. The ambient pressure about the gyro must also be stable to ensure a stable Scale Factor, since the amplitude of the mass oscillation and of the gyro output response both depend on the damping coefficient, D.

For the X-gyroscope, the equation of motion and output solution are similar to the Z-gyro.

Fabrication Process Description

Dissolved Wafer Processing

Dissolved Wafer Processing (DWP) is capable of fabricating large parts with good flatness and square profiles. The process is based on two wafers: Pyrex and silicon. On the silicon is grown an epitaxial layer. Deep reactive ion etching is then used to pattern the physical structure in the epitaxial layer. Metallization is deposited on the Pyrex. The two layers are then anodically bonded and the non-epitaxial silicon is dissolved chemically, leaving behind devices on a Pyrex substrate.

The design/process can be characterized by: device size of about 3 mm, device thickness of 40 microns, smallest flexure thickness of 5 microns and gaps between comb fingers of 5 microns nominally. Other sizes are possible. Four masks are needed, two for processing the silicon and two for the Pyrex. Gyroscope functions are distributed between the two layers: the mechanical structure and comb components are fabricated in the silicon layer and the electrical connections and flat capacitive drive components are deposited onto the Pyrex layer.

DWP has several advantages:
the device is made of one material for greater thermal stability,
all devices of the IMU are mechanically separated at the silicon level while mounted to the Pyrex substrate,
all devices of the IMU are electrically isolated,
the process can be extended to etch up to 100 microns depth,
DWP is amenable to wafer level vacuum encapsulation, and
the top and bottom surfaces have a good, flat surface finish.

Process Steps

The process steps are described with greater detail with FIG. 5. The starting silicon wafer includes a grown epitaxial layer with heavy boron diffusion of 43 micron thickness. In step 1, the epitaxial layer is etched to form mesas that support the silicon structures on the Pyrex as patterned by Mask 1. The mesa thickness also sets part of the gap between the device and the substrate that allows motion of parts up and down. In step 2, deep reactive ion etching is used to etch through the epitaxial layer to form the device geometry that includes the structure, mass and combs as patterned with Mask 2. In step 3, wells are formed in the Pyrex to form the rest of the required gap using Mask 3. With Mask 4 (step 4), metal deposited on the Pyrex is patterned to form capacitive plates for driving and sensing up and down motion. In addition it patterns traces (conductors) that connect the structure, capacitive plates and the comb stators to the pads. In step 5, the silicon wafer is anodically bonded to the Pyrex at the mesas. In step 6 the wafer is cut with a saw along outlines (streets) that separate IMUs. Each IMU is then EDP etched to remove the silicon, leaving behind epitaxial devices with movable parts. The thickness of the devices is equal to the epitaxial thickness minus the mesa thickness, approximately 40 micron for the present devices. A conceptual side view of the finished device is shown in FIG. 6.

Description of Preferred Electronics

The preferred electronics are described in block form with FIG. 7. The masses are driven at the resonant frequency, $\omega_T$, with linear comb actuators. A linear comb pick-off measures its motion. Two control loops are required. A phase-lock loop holds the mass oscillation at resonance to minimize drive power. An amplitude control loop holds the mass oscillation amplitudes constant to maintain a constant scale factor. The structure responds to gyroscopic torque by oscillating at the same frequency as the masses. The amplitude of output oscillation is proportional to the rotation rate. A rotary comb measures the output motion of the Z-gyroscope (late capacitors are used for the X-gyroscope) that is demodulated with a reference waveform signal provided by the motion of the masses. The result is a DC voltage proportional to the rate.

Z-Gyroscope Design

The preferred embodiment design comprises a silicon structure mounted to a substrate. The preferred substrate is Pyrex. It can also be silicon or some other material to be determined that is compatible with the process. This design is also possible with other processes, but the description with one process allows a cohesive description and identifies the key features of the design.

The design of the Z-gyroscope is shown in FIG. 8. The structure 10 consists of two parallel beams 12, 14, a ring 16 and four radial members 18 that connect the ring to the parallel beams. The ring is connected with four radial flexures 20 to the mesa 22. The mesa is the means by which the structure is connected to the Pyrex substrate 24 located below the structure. A gap (not shown) is formed between the silicon structure and the substrate and allows parts of the structure to move with respect to the substrate. The gap is formed in part by etching a well in the silicon and by forming another well in the Pyrex so that the total gap is equal to the sum of the two well depths. The structure is anodically bonded to the Pyrex with the mesa. The radial flexures allow the structure to rotationally oscillate about the axis normal to the plane. This oscillation occurs as a result of gyroscopic torque and is the output oscillation of the gyro.

One mass 30 is suspended from the parallel beams on one side of the ring using four flexures 40, 41, 42, 43 that allow oscillation of the mass along the drive axis which is parallel to the parallel beams. A second mass 32 is suspended from the parallel beams on the second side of the ring using four flexures 50, 51, 52, 53 that allow oscillation of the mass along the drive axis which is parallel to the parallel beams. In operation, the masses are oscillated in opposite directions.

One linear capacitive comb pick-off is located on one side of the ring comprising two halves 61, 62 with each half located across the other on either side of mass 30 to measure the motion of the mass. Two halves are used so that any force that one half of the comb design can generate to push on the mass in a direction orthogonal to the drive motion is cancelled by the second half. This force can cause the structure to oscillate about the normal to the plane and be confused with the gyro output having the same motion. A second linear capacitive comb pick-off, comprising two halves 63, 64 located on either side of mass 32 are used to measure the motion of the mass. Two halves are also used so that the pick-off can be operated differentially. The signal on each drive pick-off contains the motion of the mass along the drive axis and component due to rotation about the normal to the plane. By properly summing and differencing the signals from the two halves, the rotary motion can be distinguished from the linear motion and this data can be used to cancel the rotary content on the gyro output that is not due to gyroscopic action. With this data it is also possible to take out the rotary motion with the application of a corrective voltage on the actuator to be described.

The linear comb design 66 is shown in FIG. 9. Each half of the comb pick-off is made up of a set of fingers 67 located on the mass (referred to as the pick-off rotor) and a second set of fingers 68 fixed to the substrate with their own mesa 69 (referred to as the stator). The stator and rotor fingers are located side by side with a gap size between them selected to obtain the sensitivity required. Motion is sensed as the gap (capacitance) between the comb fingers changes. The number of paired comb fingers can be increased to increase sensitivity.

One linear capacitive comb actuator is used to move mass 30 and comprises two halves 71, 72 with each half located across the other on either side of mass 30 to apply force to the mass. Two halves are used so that any force that one half of the comb design can generate to push on the mass in a direction orthogonal to the drive motion is cancelled by the second half. This force can cause the structure to oscillate about the normal to the plane and be confused with the gyro output having the same motion. A second linear capacitive comb actuator, comprising two halves 73, 74 located on either side of mass 32, is used to apply force to the mass.

A rotary comb 80 is used to measure the rotary motion of the structure about the normal to the plane. This motion is due to gyroscopic torque. The rotary comb is separated into four quadrants 81, 82, 83, 84 as shown in FIG. 10. The comb fingers are designed radially with respect to the center mesa. The angular gap between sets of fingers is selected for the sensitivity required. The quadrants are designed so that for a given rotation, the fingers for two quadrants show a closing gap and for the other two quadrants show an increasing gap. This allows differential operation of any two neighboring quadrants of the pick-off. Four quadrants allow doubling of the signal. In differential operation, generated signals that are not due to gyroscopic output motion should be common to both quadrants of a pair and will cancel when the signals from the two quadrants are subtracted. Four quadrants also allows for the use of two as the pick-off and the other two to be used as an actuator. This actuation can be used to test the operation of the structure in output mode, calibrate pick-off sensitivity with rotation and to implement corrective actuation during operation of the gyro to decrease quadrature. Like the linear comb design, each quadrant consists of a set of fingers 90 fixed to the substrate with mesas 85, 86, 87, 88 and a corresponding set of fingers 92 on the moving ring and positioned radially next to the stationary fingers.

Traces 95 are used to make electrical connection to the structure, each pick-off and each actuator through a crimping of the trace under the respective mesas as shown in FIG. 8.

Conditions for Proper Operation

Locking of the Motion of the Two Masses

The condition for proper operation requires that the design parameters of the structure, flexures and masses are selected so that the two masses oscillate at the same frequency and in opposite directions. What enables the two masses to oscillate at the same frequency is mechanical coupling between the two masses through the common structure. Although the same drive voltage is applied to both actuators but with opposite phase, it is very difficult for each mass to resonate at the same frequency because of the differences in flexures and mass given the tolerances obtainable especially with MEMS processing. Therefore it is necessary to design the structural coupling to lock the two mass motions. The mass and flexure system for each mass is designed to be equal to the other. Practically, tolerances in the device are introduced such that, given the variability in the process, the two resonances are within some difference band. The coupling structure is then designed so that some of the oscillation from mass 1, say, is transmitted to mass 2 and some of the oscillation from mass 2 is transmitted to mass 1. This mutual leakage provides a corrective influence to make the two masses oscillate at the same frequency. The structural design can be made to operate with a larger difference band by changing the amplitude of the leakage oscillations.

One phase-lock loop is intended to drive both masses in the original electronic design. In actuality two phase-lock loops may be needed, one for each mass and two amplitude control loops are needed to hold both mass amplitudes constant. The two phase-lock loops in concert with coupling between the motions of the two masses will drive the masses to oscillate at the same frequency.

Drive Modes Separation

A second condition for proper operation is to separate in frequency the two modes of operation for the two masses: both oscillate together in the same direction and both oscillate in opposite directions (desired mode). The separation should be sufficiently large that the drive does not excite both. The frequency separation is possible through structural design.

Considerations

Unwanted Torque on the Structure Generated by the Linear Comb Actuators that Drive Both Masses Comb actuators in these designs generate two components of force, one to drive the mass along the drive axis and one in the orthogonal direction. By separating the actuator into two parts with a half on each side of the mass the orthogonal components subtract. When the orthogonal component is not reduced to zero, the orthogonal force causes rotation of the structure about the gyro output axis. We can measure the rotation due to this force and can make adjustments to how the masses are driven to reduce the rotational motion which is called quadrature because it is 90 degrees of phase separated from the gyro signal.

Differential Pick-Off Operation

The pick-off is composed of two quadrants, each of which contains a number of finger comb pairs. One half of the fingers are on a stationary member and the second half are located on the moving member. Two gaps are involved: a small gap between finger pairs and a larger gap between neighboring finger pairs. If the two gaps are the same, there is no sensitivity. A best gap ratio is used to maximize the output. Finally the fingers of each quadrant are oriented so that for a motion, the small gap for fingers of one quadrant increases, say, while the small gap for the fingers of the second quadrant decreases. In this mode the two quadrants operate differentially. When their signals are differenced, the wanted signals are doubled and the common-mode (unwanted) signals are subtracted.

Electrical Leads (Traces)

The electrical leads (traces) are routed symmetrically because they can impact the stability of the pick-off. In addition to trace asymmetry any other contribution to common-mode signals that are not balanced will contribute to pick-off instability. As much as the stability of the mechanical transducer is important, the stability of the pick-off is equally as important.

Care is also taken to minimize cross-talk between traces. A drive voltage signal could be picked up by the output traces from the pick-off that constitutes a second source of quadrature. Cross-talk can be minimized by proper trace routing, shielding and proper signal demodulation.

Alternative Design—Isolation

An alternative design to minimize rotary actuation when driving the masses is to drive the masses relative to the structure. This requires the separation of the structure into isolated electrical regions. With the present design the full structure is at one electrical potential (ground).

X-Gyroscope Design

The design of the preferred embodiment of the X-gyroscope 100 is shown in FIG. 11. The design is identical to the Z-gyroscope design, with several exceptions.

The structure 101 consists of two parallel beams 102, 104, a ring 106 and four members 18 that connect the ring to the parallel beams. The ring is connected with two in-line torsional flexures 120 to the mesa 122. The mesa is the means by which the structure is connected to the Pyrex substrate 124 below the structure. A gap (not shown) is formed between the silicon structure and the substrate and allows parts of the structure to move relative to the substrate. The gap is formed in part by etching a well in the silicon and by forming another well in the Pyrex so that the total gap is equal to the sum of the two well depths. The structure (made of silicon) is anodically bonded to the Pyrex with the mesa. The torsional flexures allow the structure to rotationally oscillate relative to the surface about an axis in the plane. This oscillation occurs as a result of gyroscopic torque and is the output oscillation of the gyro.

The oscillation of the masses is done in the same way and with the same components as is done for the Z-gyroscope.

A plate capacitor pick-off is used to measure the rotary motion of the structure relative to the plane (towards and away). The plates are metallizations formed onto the Pyrex surface and are located under the masses. The measured motion is due to gyroscopic torque. The pick-off is separated into two halves 181, 182 as shown in FIG. 11 so that differential operation can be used. A second set of capacitor plates 183, 184 can be used to double the pick-off signal or it can be used to actuate the motion about the output axis to calibrate the pick-off. Other arrangements of plates can be used.

Z-Gyroscope, Four-Mass Design

A Z-gyroscope based on three or more masses is possible. In FIG. 12 a four-mass concept is illustrated. Analytically it can be modeled in the same way as the two-mass design with the exception that twice the gyroscopic torque is developed per same input rotation rate provided the total mass is doubled. The concept is none other than two superimposed Z-gyroscopes working through one supporting structure. The drive frequency must be the same and the four sets of masses must work in phase so that all move radially outwards and then move radially inwards.

Z-Gyroscope; One-Mass Design

A Z-gyroscope based on one mass is possible by rigidly fixing one of the masses of the two mass Z-Gyroscopes shown in FIG. 8 and FIG. 13 so that it does not oscillate. This can be done by making the flexures that support the mass thicker. In this case the pick-offs and actuators of the stationary mass are not used. Analytically this design can be modeled in the same way as the two-mass design with the exception that half the gyroscopic torque is developed per same input rotation rate. This design is much simpler to operate since lock-in of the masses is not required. The moment of the fixed mass should balance the center of mass of the oscillating mass for stability.

Z-Gyroscope with Outer Output Sensor

The preferred embodiment design comprises a silicon structure mounted to a substrate. The preferred substrate is Pyrex. It can also be silicon or some other material to be determined that is compatible with the process. This design is also possible with other processes, but the description with one process allows a cohesive description and identifies the key features of the design.

Another design of the Z-gyroscope is shown in FIG. 13. The structure 10 consists of two parallel beams 44, 46, two arc-shaped structures 48, 49 and four members 54, 55, 56, 57 that connect structures 48 and 49 to the parallel beams. Structures 48 and 49 are connected by four radial flexures 75, 76, 77, 78 to four separate mesas 33, 34, 35, 36, respectively. The mesa is the means by which the structure is connected to the Pyrex substrate 24 located below the structure. A gap (not shown) is formed between the silicon structure and the substrate and allows parts of the structure to move with respect to the substrate. The gap is formed in part by etching a well in the silicon and by forming another well in the Pyrex so that the total gap is equal to the sum of the two well depths. The structure (made of silicon) is anodically bonded to the Pyrex mesas. The radial flexures allow the structure to rotationally oscillate about the axis normal to the plane. This oscillation occurs as a result of gyroscopic torque and is the output oscillation of the gyro.

One mass 20 is suspended from the parallel beams on one side of center using four flexures 96, 97, 98, 99 that allow oscillation of the mass along the drive axis which is parallel to the parallel beams. A second mass 22 is suspended from the parallel beams on the second side of the ring using four flexures 111, 112, 113, 114 that allow oscillation of the mass along the drive axis which is parallel to the parallel beams. In operation, the masses are oscillated in opposite directions.

One linear capacitive comb pick-off is used to sense the motion of mass 20 comprising two halves 115, 116 with each half located across the other on either side of the mass. Two halves are used so that any force that one half of the comb design can generate to push on the mass in a direction orthogonal to the drive motion is cancelled by the second half. This force can cause the structure to oscillate about the normal to the plane and be confused with the gyro output having the same motion. A second linear capacitive comb pick-off is used to sense the motion of mass 22 comprising two halves 117, 118 with each half located on either side of mass 22. Two halves are also used so that the pick-off can be operated differentially. The signal on each drive pick-off contains the motion of the mass along the drive axis and a component due to rotation about the normal to the plane. By properly summing and differencing the signals from the two halves, the rotary motion can be distinguished from the linear motion and this data can be used to cancel the rotary content on the gyro structure motion that is not due to gyroscopic action. With this data it is also possible to take out the rotary motion with the application of a corrective voltage on the actuator to be described.

The linear comb design 66 is shown in FIG. 9. Each half of the comb pick-off is made up of a set of fingers 67 located on the mass (referred to as the pick-off rotor) and a second set of fingers 68 fixed to the substrate with their own mesa 69 (referred to as the stator). The stator and rotor fingers are located side by side with a gap size between them selected to obtain the sensitivity required. Motion is sensed as the gap (capacitance) between the comb fingers changes. The number of paired comb fingers can be increased to increase sensitivity.

One linear capacitive comb actuator is used to move mass 20 comprising two halves 58, 59 with each half located across the other on either side of mass 20 to apply force to the mass. Two halves are used so that any force that one half of the comb design can generate to push on the mass in a direction orthogonal to the drive motion is cancelled by the second half. This force can cause the structure to oscillate about the normal to the plane and be confused with the gyro output having the same motion. A second linear capacitive comb actuator, comprising two halves 37, 38 located on either side of mass 22, are used to apply force to the mass.

A rotary comb comprising two halves 26, 28 is used to measure the rotary motion of the structure about the normal to the plane. This motion is due to gyroscopic torque. The rotary comb is separated into two quadrants for each half 23, 25 and 27, 29. The comb fingers are radial with respect to the center of rotation. The angular gap between sets of fingers is selected for the sensitivity required. The quadrants are designed so that for a given rotation, the fingers for two quadrants show a closing gap and for the other two quadrants show an increasing gap. This allows differential operation of any two neighboring quadrants of the pick-off. Four quadrants allow doubling of the signal. In differential operation, generated signals that are not due to gyroscopic output motion should be common to both quadrants of a pair and will cancel when the signals from the two quadrants are subtracted. Four quadrants also allows for the use of two as the pick-off and the other two to be used as an actuator. This actuation can be used to test the operation of the structure in output mode, calibrate pick-off sensitivity with rotation and to implement corrective actuation during operation of the gyro to decrease quadrature. Like the linear comb design, each quadrant consists of a set of fingers fixed to the substrate with mesas 125, 126, 127, 128 and a corresponding set of fingers positioned radially next to the stationary fingers and on the two circular moving structures.

Inertial Measurement Units

Three IMU design options are possible for the Z-gyro:

a) as the Z-gyro for the Integrated IMU b) as the X and Z tuning fork gyroscopes for an Integrated IMU c) as the Z-Gyro mounted onto three orthogonal faces of a three-sided pyramid.

One Integrated IMU lay-out consists of a three-by-three cellular matrix containing eight instruments and a center cell filled with test structures. Each cell is the same size. All electrical pads are located on one edge of each cell and oriented so that wire bonding to the package terminals can be accomplished with short wires.

Integrated IMU with Z-Gyroscope

The Z-gyroscope can be used in an Integrated IMU design as shown in FIG. 14. This IMU can also make use of four accelerometers to measure rotation rate about the normal to the plane by measuring linear as well as angular acceleration.

In the first row, from left to right, are located the Z-gyro, the first X-accelerometer and the X-gyroscope (non tuning fork design). In the second row are located the first Y-accelerometer, test structures in the center cell and a second Y-accelerometer. In the third row are located the Z-axis accelerometer, a second X-accelerometer and a Y-gyroscope (non-tuning fork design).

The four X and Y-accelerometers are aligned in a cross-pattern. They are also oriented to sense angular acceleration about the Z-axis. By properly adding and subtracting the signals from the four accelerometers, the linear and angular accelerations can be separated. The angular acceleration component is then related to rotation rate by $$\dot{\Omega}_Z = \frac{k}{mr}\Delta x \qquad (4)$$

where $\dot{\Omega}_Z$ is the derivative of the rotation rate about the z-axis, k is the accelerometer spring coefficient, m is the accelerometer mass, r is the distance of the accelerometer mass from the center of the chip, and $\Delta x$ is the displacement of the mass in the accelerometer. To obtain rotation rate requires integration of the measured angular acceleration.

Integrated IMU with Tuning Fork X and Z-Gyroscopes

A conceptual rendition of the Integrated IMU with only the tuning fork gyroscopes is shown in FIG. 15.

In the first row, from left to right, are located the Z-Gyro, the first X-Accelerometer and the X-Gyro. In the second row are located the first Y-Accelerometer, an available center cell, and a second Y-Accelerometer. In the third row are located the Z-Accelerometer, a second X-Accelerometer and Y-Gyro (a rotated X-Gyro).

Pyramidal IMU

The three-sided pyramid is shown in FIG. 16. It is an alternative to the cube for mounting IMU instruments since it allows for a thinner package, although the package width may increase. With Z-gyroscopes an additional benefit is realized. Since the gyro Input Axis is normal to the chip surface, when the chip is bonded to the orthogonal faces of the pyramid, the instruments are automatically aligned.

An advantage of the pyramid design over Integrated IMU designs is that hand-picked, superior instruments can be used.

Although specific features of the invention are shown in some drawings and not others, this is for convenience only as some feature may be combined with any or all of the other features in accordance with the invention.

Other embodiments will occur to those skilled in the art and are within the following claims.

What is claimed is:

1. A monolithic, generally planar gyroscope for detecting rotation about a gyro input axis that is coincident with the gyro output axis, comprising:

a substrate defining a non-conductive surface;

a post coupled to the substrate and projecting from the surface of the substrate, the post defining a center;

a generally planar rigid frame spaced above the surface of the substrate and comprising a pair of spaced parallel rails that define an interior region between them;

a plurality of radial flexures that couple the frame to the post so as to allow rotation of the frame relative to the substrate about an output axis that is orthogonal to the substrate surface, the flexures lying along radii from the center of the post;

first and second masses lying in the plane of the frame and flexibly coupled to the frame such that each mass is capable of motion in two directions along a common drive axis that is parallel to the substrate surface and orthogonal to the gyro input and output axes;

four bending flexures that couple each mass to the frame, two spaced flexures coupling each mass to one rail and two spaced flexures coupling each mass to the other rail;

two capacitive comb actuators for oscillating the first mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;

two capacitive comb actuators for oscillating the second mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;

two capacitive comb motion sensors for sensing motion of the first mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;

two capacitive comb motion sensors for sensing motion of the second mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;

electronics that provide a sinusoidal drive voltage to the comb actuators, the drive voltage applied to the comb actuator for a first mass at a first phase and the drive voltage applied to the comb actuator for a second mass at the opposite phase, to drive the masses in opposition along the drive axis;

phase-lock loop electronics, responsive to the mass motion sensors, for controlling the actuators such that the masses oscillate in opposition, at the same frequency and at resonance;

amplitude control loop electronics, responsive to the mass motion sensors, for controlling the actuators to maintain the oscillation amplitude of the masses constant;

one or two pairs of capacitive comb gyro output sensors radially arranged about the output axis, the output sensors detecting rotation of the frame relative to the substrate about the gyro output axis, each output sensor comprising a stator made of a plurality of spaced fingers on the surface of the substrate and lying along radii from the center of the post and a rotor made from a plurality of spaced fingers coupled to the frame and lying along different radii from the center of the post, the fingers of the rotor interdigitated among the fingers of the stator, wherein the stator and rotor fingers of one the pair of output sensors are arranged such that as the frame rotates clockwise about the output axis the rotor fingers move closer to the stator fingers, and wherein the stator and rotor fingers of the other of the pair of output sensors are arranged such that as the frame rotates clockwise about the output axis the rotor fingers move farther away from the stator fingers, and wherein the stator and rotor fingers of each of the output sensors are further arranged in pairs, one stator finger and one rotor finger making up each pair, the fingers of each pair separated by a small gap, and adjacent pairs separated from one another by a larger gap;

electronics that subtract the output of one output sensor from the output of the other output sensor of a pair of sensors, to obtain a differential signal indicative of rotation of the frame about the output axis;

wherein the frame, the masses, the flexures and the combs are all fabricated from a monolithic layer of material, wherein the stators are electrically isolated from one another by the non-conductive surface of the substrate, and wherein the gyroscope is designed to separate in frequency the two modes of oscillation of the two masses along the drive axis: one mode in which the masses oscillate together in the same direction and one mode in which the masses oscillate in opposition, the frequency separation sufficiently large such that the drive voltage excites only the oscillation in opposition, and wherein the two masses couple when driven so that they oscillate at the same frequency.

2. The gyroscope of claim 1 in which there are at least two pairs of flexibly-coupled masses, the masses of each such pair moving in opposition along a common drive axis, in which the drive axes are radial about a center of rotation.

3. The gyroscope of claim 1 further comprising a regular tetrahedron base member defining at least three faces, wherein the substrate is coupled to a face of the base member.

4. The gyroscope of claim 1 in which the frame further comprises a ring spaced from and surrounding the post, wherein the flexures couple the ring to the post.

5. The gyroscope of claim 4 in which the ring is rigidly coupled to the beams.

6. A monolithic, generally planar gyroscope for detecting rotation about a gyro input axis that is coincident with the gyro output axis, comprising:
a substrate defining a non-conductive surface;
a generally planar rigid frame spaced above the surface of the substrate and comprising a pair of spaced parallel rails that define an interior region between them;
a plurality of posts coupled to the substrate and projecting from the surface of the substrate, wherein the posts are located outside of the rails;
a plurality of radial flexures that couple the frame to the posts so as to allow rotation of the frame relative to the substrate about an output axis that is orthogonal to the substrate surface, the flexures lying along radii from the center of the gyroscope;
first and second masses lying in the plane of the frame and flexibly coupled to the frame such that each mass is capable of motion in two directions along a common drive axis that is parallel to the substrate surface and orthogonal to the gyro input and output axes;
four bending flexures that couple each mass to the frame, two spaced flexures coupling each mass to one rail and two spaced flexures coupling each mass to the other rail;
two capacitive comb actuators for oscillating the first mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;
two capacitive comb actuators for oscillating the second mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;
two capacitive comb motion sensors for sensing motion of the first mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;
two capacitive comb motion sensors for sensing motion of the second mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;

electronics that provide a sinusoidal drive voltage to the comb actuators, the drive voltage applied to the comb actuator for a first mass at a first phase and the drive voltage applied to the comb actuator for a second mass at the opposite phase, to drive the masses in opposition along the drive axis;

phase-lock loop electronics, responsive to the mass motion sensors, for controlling the actuators such that the masses oscillate in opposition, at the same frequency and at resonance;

amplitude control loop electronics, responsive to the mass motion sensors, for controlling the actuators to maintain the oscillation amplitude of the masses constant;

one or two pairs of capacitive comb gyro output sensors radially arranged about the output axis, the output sensors detecting rotation of the frame relative to the substrate about the gyro output axis, each output sensor comprising a stator made of a plurality of spaced fingers on the surface of the substrate and lying along radii from the center of the post and a rotor made from a plurality of spaced fingers coupled to the frame and lying along different radii from the center of the post, the fingers of the rotor interdigitated among the fingers of the stator, wherein the stator and rotor fingers of one the pair of output sensors are arranged such that as the frame rotates clockwise about the output axis the rotor fingers move closer to the stator fingers, and wherein the stator and rotor fingers of the other of the pair of output sensors are arranged such that as the frame rotates clockwise about the output axis the rotor fingers move farther away from the stator fingers, and wherein the stator and rotor fingers of each of the output sensors are further arranged in pairs, one stator finger and one rotor finger making up each pair, the fingers of each pair separated by a small gap, and adjacent pairs separated from one another by a larger gap;

electronics that subtract the output of one output sensor from the output of the other output sensor of a pair of sensors, to obtain a differential signal indicative of rotation of the frame about the output axis;

wherein the frame, the masses, the flexures and the combs are all fabricated from a monolithic layer of material, wherein the stators are electrically isolated from one another by the non-conductive surface of the substrate, and wherein the gyroscope is designed to separate in frequency the two modes of oscillation of the two masses along the drive axis: one mode in which the masses oscillate together in the same direction and one mode in which the masses oscillate in opposition, the frequency separation sufficiently large such that the drive voltage excites only the oscillation in opposition, and wherein the two masses couple when driven so that they oscillate at the same frequency.

7. A monolithic, generally planar gyroscope for detecting rotation about a gyro input axis that is coincident with the gyro output axis, comprising:
- a substrate defining a non-conductive surface;
- a post coupled to the substrate and projecting from the surface of the substrate, the post defining a center;
- a generally planar rigid frame spaced above the surface of the substrate and comprising a pair of spaced parallel rails that define an interior region between them;
- a plurality of colinear torsional flexures that couple the frame to the post so as to allow rotation of the frame relative to the substrate about an output axis that is parallel to the substrate surface, the flexures lying along radii from the center of the post;
- first and second masses lying in the plane of the frame and flexibly coupled to the frame such that each mass is capable of motion in two directions along a common drive axis that is parallel to the substrate surface and orthogonal to the gyro input and output axes;
- four bending flexures that couple each mass to the frame, two spaced flexures coupling each mass to one rail and two spaced flexures coupling each mass to the other rail;
- two capacitive comb actuators for oscillating the first mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;
- two capacitive comb actuators for oscillating the second mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;
- two capacitive comb motion sensors for sensing motion of the first mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;
- two capacitive comb motion sensors for sensing motion of the second mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;
- electronics that provide a sinusoidal drive voltage to the comb actuators, the drive voltage applied to the comb actuator for a first mass at a first phase and the drive voltage applied to the comb actuator for a second mass at the opposite phase, to drive the masses in opposition along the drive axis;
- phase-lock loop electronics, responsive to the mass motion sensors, for controlling the actuators such that the masses oscillate in opposition, at the same frequency and at resonance;
- amplitude control loop electronics, responsive to the mass motion sensors, for controlling the actuators to maintain the oscillation amplitude of the masses constant;
- one or two pairs of capacitive plate gyro output sensors, one plate of each pair located on the surface of the substrate underneath a mass, the output sensors detecting rotation of the masses relative to the substrate about the gyro output axis;
- electronics that subtract the output of one output sensor from the output of the other output sensor of a pair of sensors, to obtain a differential signal indicative of rotation of the frame about the output axis;
- wherein the frame, the masses, the flexures and the combs are all fabricated from a monolithic layer of material, wherein the stators are electrically isolated from one another by the non-conductive surface of the substrate, and wherein the gyroscope is designed to separate in frequency the two modes of oscillation of the two masses along the drive axis: one mode in which the masses oscillate together in the same direction and one mode in which the masses oscillate in opposition, the frequency separation sufficiently large such that the drive voltage excites only the oscillation in opposition, and wherein the two masses couple when driven so that they oscillate at the same frequency.

8. A monolithic, generally planar gyroscope for detecting rotation about a gyro input axis that is coincident with the gyro output axis, comprising:
- a substrate defining a non-conductive surface;
- a post coupled to the substrate and projecting from the surface of the substrate, the post defining a center;
- a generally planar rigid frame spaced above the surface of the substrate and comprising a pair of spaced parallel rails that define an interior region between them;
- a plurality of radial flexures that couple the frame to the post so as to allow rotation of the frame relative to the substrate about an output axis that is orthogonal to the substrate surface, the flexures lying along radii from the center of the post;
- first and second masses lying in the plane of the frame, one movable mass flexibly coupled to the frame such that it is capable of motion in two directions along a common drive axis that is parallel to the substrate surface and orthogonal to the gyro input and output axes, and the other mass fixed relative to the frame;

four bending flexures that couple the movable mass to the frame, two spaced flexures coupling the movable mass to one rail and two spaced flexures coupling the movable mass to the other rail;

two capacitive comb actuators for oscillating the movable mass along the drive axis, one comb actuator on one side of the drive axis and the other comb actuator on the other side of the drive axis, each comb actuator comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the comb actuators are further arranged in pairs, one stator finger and one rotor finger making up each pair, the fingers of each pair separated by a small gap, and adjacent pairs separated from one another by a larger gap;

two capacitive comb motion sensors for sensing motion of the movable mass along the drive axis, one comb motion sensor on one side of the drive axis and the other comb motion sensor on the other side of the drive axis, each comb motion sensor comprising a stator made of a plurality of spaced fingers on the surface of the substrate and a rotor comprising a plurality of spaced fingers coupled to the mass, the fingers of the rotor interdigitated among the fingers of the stator, and wherein the stator and rotor fingers of each of the motion sensors are further arranged in pairs, one stator finger and one rotor finger making up each pair, the fingers of each pair separated by a small gap, and adjacent pairs separated from one another by a larger gap;

electronics that provide a sinusoidal drive voltage to the comb actuators, to drive the movable mass along the drive axis;

phase-lock loop electronics, responsive to the mass motion sensors, for controlling the actuators such that the movable mass oscillates at resonance;

amplitude control loop electronics, responsive to the mass motion sensors, for controlling the actuators to maintain the oscillation amplitude of the movable mass constant;

one or two pairs of capacitive comb gyro output sensors radially arranged about the output axis, the output sensors detecting rotation of the frame relative to the substrate about the gyro output axis, each output sensor comprising a stator made of a plurality of spaced fingers on the surface of the substrate and lying along radii from the center of the post and a rotor made from a plurality of spaced fingers coupled to the frame and lying along different radii from the center of the post, the fingers of the rotor interdigitated among the fingers of the stator, wherein the stator and rotor fingers of one the pair of output sensors are arranged such that as the frame rotates clockwise about the output axis the rotor fingers move closer to the stator fingers, and wherein the stator and rotor fingers of the other of the pair of output sensors are arranged such that as the frame rotates clockwise about the output axis the rotor fingers move farther away from the stator fingers, and wherein the stator and rotor fingers of each of the output sensors are further arranged in pairs, one stator finger and one rotor finger making up each pair, the fingers of each pair separated by a small gap, and adjacent pairs separated from one another by a larger gap;

electronics that subtract the output of one output sensor from the output of the other output sensor of a pair of sensors, to obtain a differential signal indicative of rotation of the frame about the output axis;

wherein the frame, the masses, the flexures and the combs are all fabricated from a monolithic layer of material, and wherein the stators are electrically isolated from one another by the non-conductive surface of the substrate.

* * * * *

UNITED STATES PATENT AND TRADEMARK OFFICE
CERTIFICATE OF CORRECTION

PATENT NO. : 7,617,728 B2  Page 1 of 1
APPLICATION NO. : 11/383814
DATED : November 17, 2009
INVENTOR(S) : Donato Cardarelli It is certified that error appears in the above-identified patent and that said Letters Patent is hereby corrected as shown below:

Claim 6, at Column 16, line 1, should read as follows:

sensor on one side of the drive axis and "theother" --the other-- comb

Signed and Sealed this

Nineteenth Day of January, 2010

David J. Kappos
*Director of the United States Patent and Trademark Office*